Feb. 2, 1926.

E. A. KERR 1,571,589

APPARATUS FOR THE MANUFACTURE OF CANDLES

Filed June 8, 1925  2 Sheets-Sheet 1

INVENTOR
Elizabeth A. Kerr,
by Bright & Bailey
Attys.

Patented Feb. 2, 1926.

1,571,589

UNITED STATES PATENT OFFICE.

ELIZABETH ANNA KERR, OF DUBLIN, IRELAND.

APPARATUS FOR THE MANUFACTURE OF CANDLES.

Application filed June 8, 1925. Serial No. 35,801.

*To all whom it may concern:*

Be it known that I, ELIZABETH ANNA KERR, subject of the King of Great Britain, and residing at Apsley House, Charleston Road, Rathmines, Dublin, Ireland, have invented Improvements in and Relating to Apparatus for the Manufacture of Candles; and I do hereby declare the following to be a full, clear, and exact description of the invention, such as will enable others skilled in the art to which it appertains to make and use the same.

This invention relates to apparatus for forming the wax of candles into cylindrical or polygonal lengths, with the wick disposed axially or in other required linear position along each length. The object of this invention is to provide such an apparatus which will enable such lengths to be formed in a more expeditious and convenient manner than obtained at present.

Broadly a process of manufacturing candles according to this invention comprises the feeding of wax and wick simultaneously through a former or mould, the wax with the wick issuing from the former for cutting into the desired lengths for candles.

An apparatus constructed in accordance with this invention comprises one or more tubular moulds, or formers of the desired section, means for forcing the molten wax into such former or mould so as to cause the wax to travel along each mould or former and to issue therefrom in solid form, and means whereby wick is caused to travel along the mould or former with the wax, whereby it becomes incorporated with the wax as it issues from the mould or former.

When the wax with the wick issues from the mould or former it can be cut automatically into the desired lengths, ready for candles, or it can be allowed to issue in lengths which are removed and cut again into smaller lengths to form candles. When the issuing wax is automatically cut into the desired lengths, each length may also be automatically formed with the conical or other desired configuration of point.

My invention may be carried into practice in a number of ways, and it may be manually or machine operated according to the size and nature of work involved, but in order to describe the principle of my invention more clearly I have appended herewith a sheet of drawings diagrammatically illustrating mechanical apparatus for same and wherein:—

Figure 1:
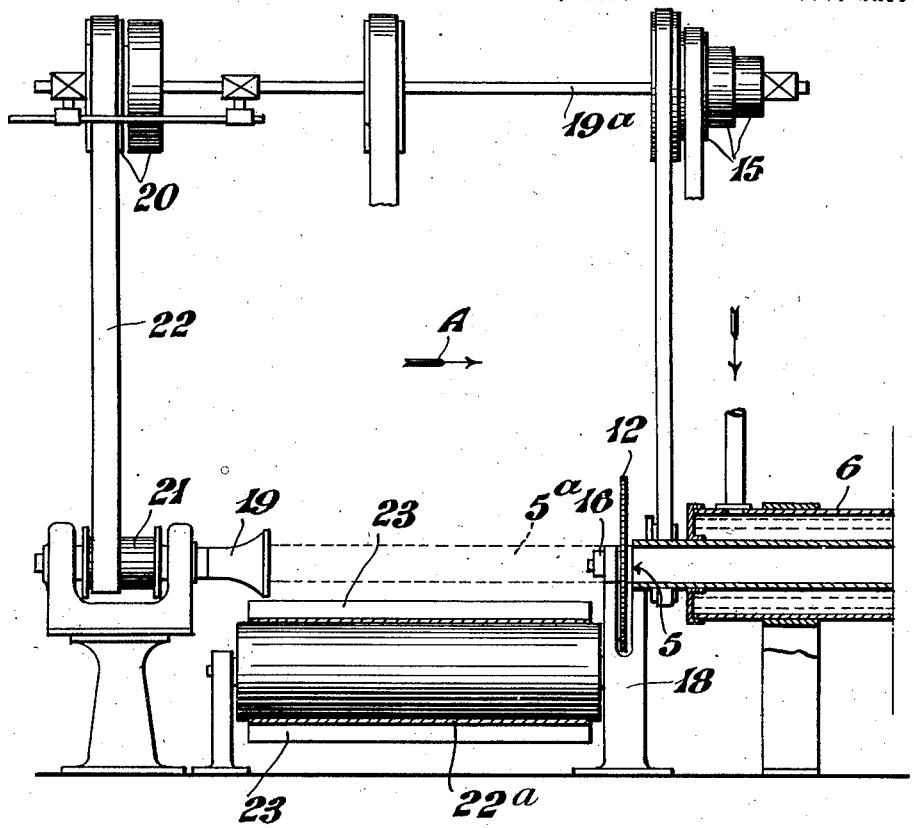
Fig. 1 is a part sectional side elevation, the proportions of the various parts being necessarily exaggerated for the sake of clearness.
Figure 1:
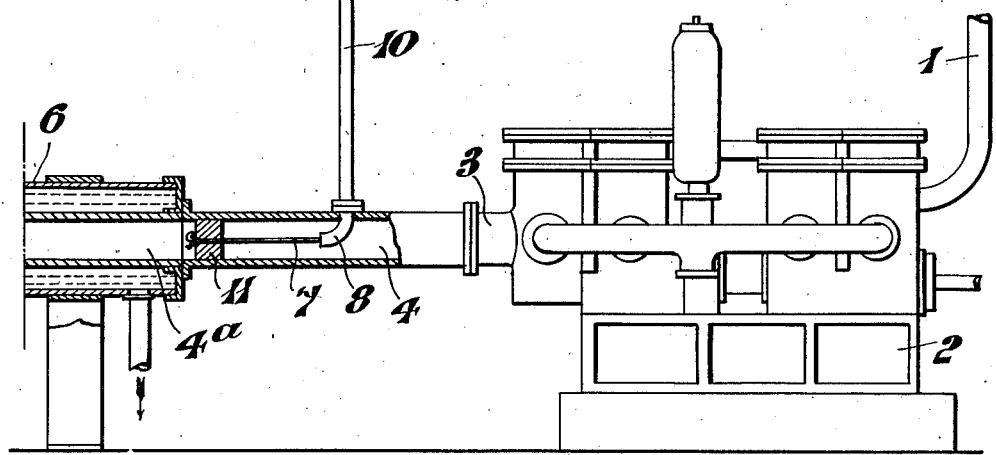
Figure 2:
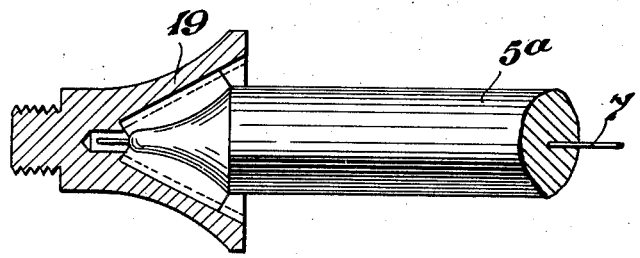
Fig. 2 is a view illustrating the forming of a point to each candle.
Figure 3:
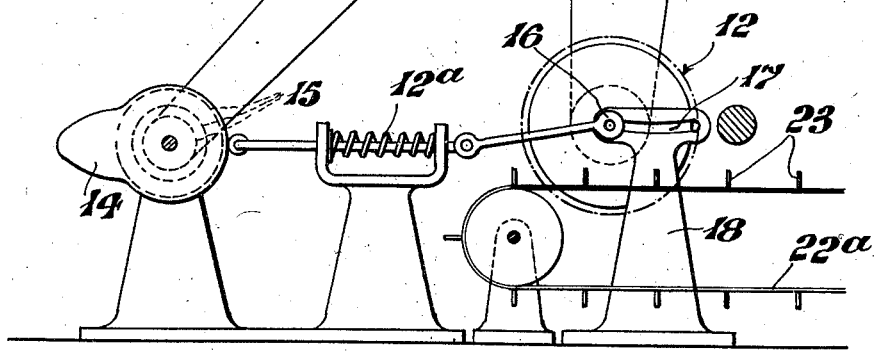
Fig. 3 is a diagrammatic end view looking in the direction of the arrow A, Fig. 1, illustrating the cutting of the lengths of candles.

Referring to the drawings the molten wax is adapted to flow, be drawn or be forced from a suitable vat not shown, through one or more pipes 1 into a pumping apparatus 2 of any suitable form, from whence it is forced through an outlet 3 whilst still in a molten state into a mould 4 which is sufficiently long to enable the wax to become solid before it issues from the discharge end 5 in the form of a candle length 5A. The mould 4 is preferably made up of several lengths of metal tubing detachably connected end on end, so as to facilitate a change of mould, cleaning, repairs, or for any other reason necessitating disassembling.

A part of each mould, indicated in the drawings by the reference 4ª passes through a cooling apparatus 6, which may be of any suitable arrangement, and is shown in the drawings as a water jacket through which cold water is adapted to be continuously circulated. Alternatively cold air may be employed, or the cooling apparatus may be in the form of a freezer, or in the form of cooling vanes or webs, it being understood that the form and dimensions of cooling apparatus employed is necessarily somewhat dependent upon the size and rate of operation of the wax feeding or forcing apparatus.

The part 4ª of the mould may be adapted to detachably accommodate a smaller mould which can be slidden in and out of the part 4ª for interchanging thereby obviating the necessity of dismantling the cooling apparatus.

As the wax is forced through the mould 4 it carries with it the wick 7 which is fed to the centre of the mould through a nozzle 8 to which it is guided from a suitably supported spool or bobbin 9 by means of a tubular guide 10. When the apparatus is ready for starting up the wick 7 is secured to a piston or block 11 having a close fit in the mould, and consequently as the molten wax is fed into the mould under pressure it carries with it the block 11 with the result that the wick is fed along the centre of the wax. When the wax issues from the discharge end of the mould the block 11 is cut off as it is of no further use, the solidified wax at the leading end of the mould serving to pull the wick continuously through the nozzle 8 as the wax is forced into the mould.

It will of course be understood that the block 11 would be initially positioned in the smallest diameter part of the mould should there be any differences in the internal diameter of the mould, as for instance as hereinbefore mentioned when the part 4a is adapted to accomodate detachable moulds.

As the wax with the wick arranged along its centre emerges from the discharge end 5 it can be cut off at regular intervals by any suitable cutter adjacent the discharge end, and in the drawings this cutter is shown somewhat diagrammatically in the form of a rotating saw 12 which is quickly moved through the wax and wick against the influence of a spring 12a by means of a rotating cam disc 14, the cam portion of the disc being shaped to give the requisite periodicity of reciprocation of the saw, stepped pulleys 15 or other suitable means being provided for adjusting the intervals between the operations of the saw. The saw is supported by a bearing 16 which is guided in an arcuate slot 17 in a bracket 18, the radius of the driving shaft 19a.

To enable the conical end of the candles to be formed, a rotating cutter 19 is provided axially aligned with the discharge end of the mold 4, such cutter being selectively rotated from the driving shaft 19a by means of fast and loose pulleys 20 and a pulley 21 connected by a belt 22. If desired the cutter 19 may be carried by a collar slidably keyed on the shaft of the pulley 21, cam or other suitable mechanism being provided to reciprocate the collar with its cutter axially along the shaft 21, the reciprocation being intermittent and arranged to synchronize with the intermittent operation of the saw 12, so that the saw 12 and the cutter 19 operates on the candle alternately, the cutter 19 of course operating first.

The arrangement of the cam disc 14 and the driving mechanism thereof is such that a very speedy cutting operation of the saw is effected with sufficiently long intervals to ensure that when a candle has been cut another supply of solidified wax will have time to reach the cutter 19 and have its conical end shaped before the saw again comes into operation.

Any suitable means may be provided for receiving the cut candles, one suitable means shown in the drawings comprising a travelling endless band 22a with upstanding ribs or webs 23 between which the candles are adapted to lodge, a receptacle being provided at one end of the endless band to receive the candles as they drop off the band. Alternatively the candles may be picked off the travelling band and packed into boxes by operators.

When the apparatus is stopped any solidified wax in the mould or the pump can be melted again when and where necessary when it is desired to start up the apparatus again, by applying heat to the parts of the apparatus necessary.

The wick nozzle 8 is detachable and replaceable and if desired lubricators may be provided with the tubuluar guide 10 to facilitate the travel of the wick.

I wish it to be understood that the foregoing description is purely diagrammatic and is only intended to describe the broad principle of my invention structural details of the various parts being too well known in the various engineering professions to require detailed description. It will of course be appreciated that the same pump or pressure agent may be employed for feeding wax through a plurality of molds simultaneously each mould if necessary having associated with its own mechanism for cutting and coning the candles, although of course the same saw 12 or its equivalent may serve to operate in conjunction with more than one mould by a slight modification of the cam 14 if necessary.

What I claim is:—

1. A unitary automatic apparatus for manufacturing candles comprising a mold, means for introducing a wick in said mold, means for forcing wax through the mold, a cutter arranged to shape the end of the wax after it issues from said mold, and means operating intermittently to sever the wax issuing from the mold following each operation of the cutter to shape the end thereof.

2. A unitary automatic apparatus for manufacturing candles comprising a mold, means for introducing a wick in said mold, means for forcing wax through the mold, a cutter arranged to shape the end of the wax after it issues from said mold, means operating intermittently to sever the wax issuing from the mold following each operation of the cutter to shape the end thereof, and a single drive shaft from which said cutter and said severing means are driven.

In witness hereof I have signed this specification.

ELIZABETH ANNA KERR.